April 11, 1967
W. J. SACKETT, SR
3,313,529
BULK BLEND PLANT AND SYSTEM
Filed Sept. 25, 1964
6 Sheets-Sheet 1
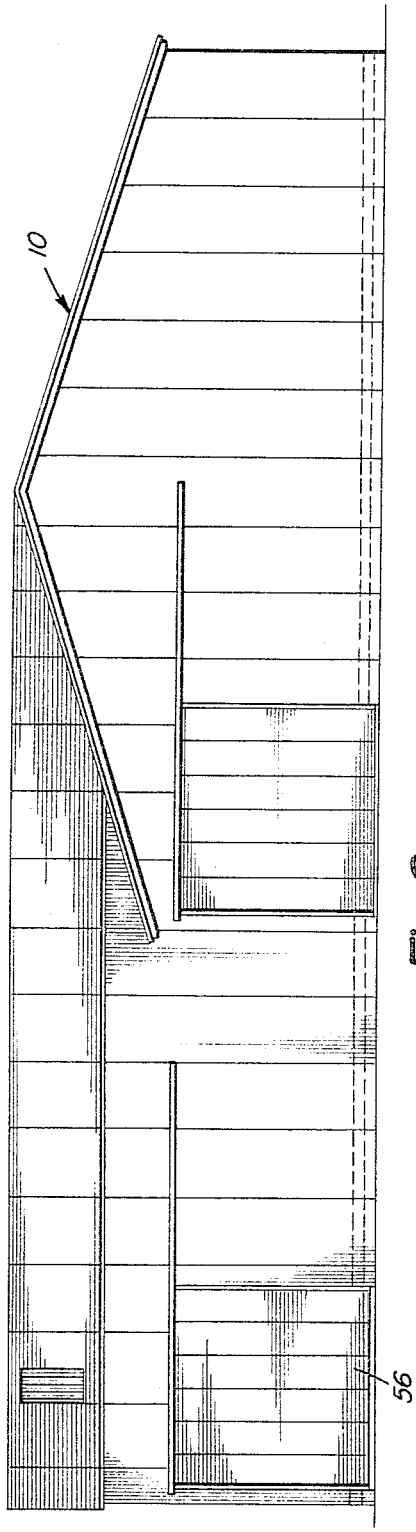
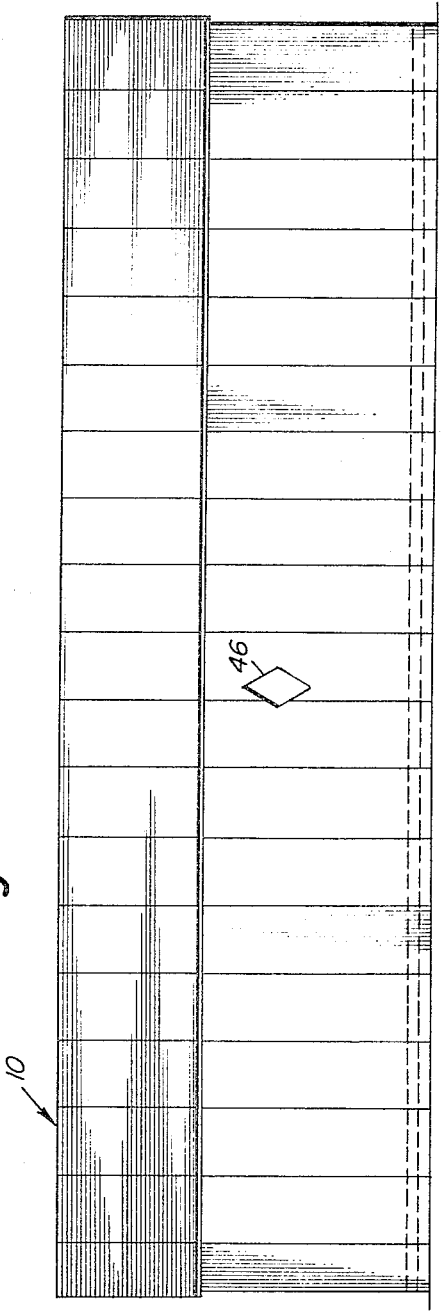
INVENTOR
Walter J. Sackett, Sr.
BY Walter G. Finch
ATTORNEY April 11, 1967 W. J. SACKETT, SR 3,313,529
BULK BLEND PLANT AND SYSTEM
Filed Sept. 25, 1964 6 Sheets-Sheet 2
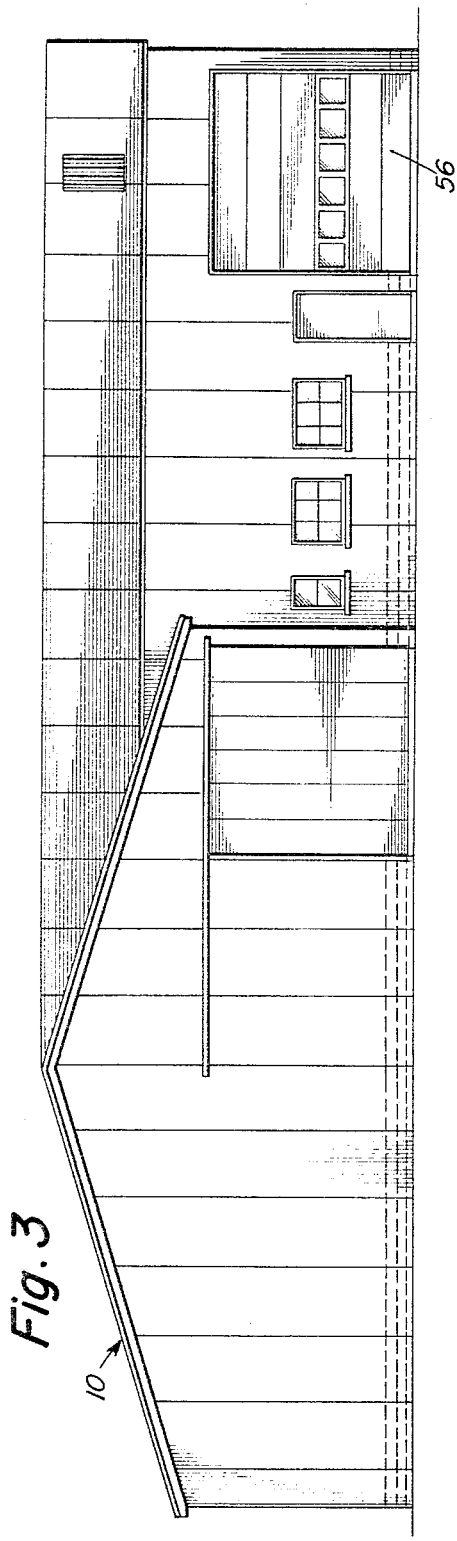
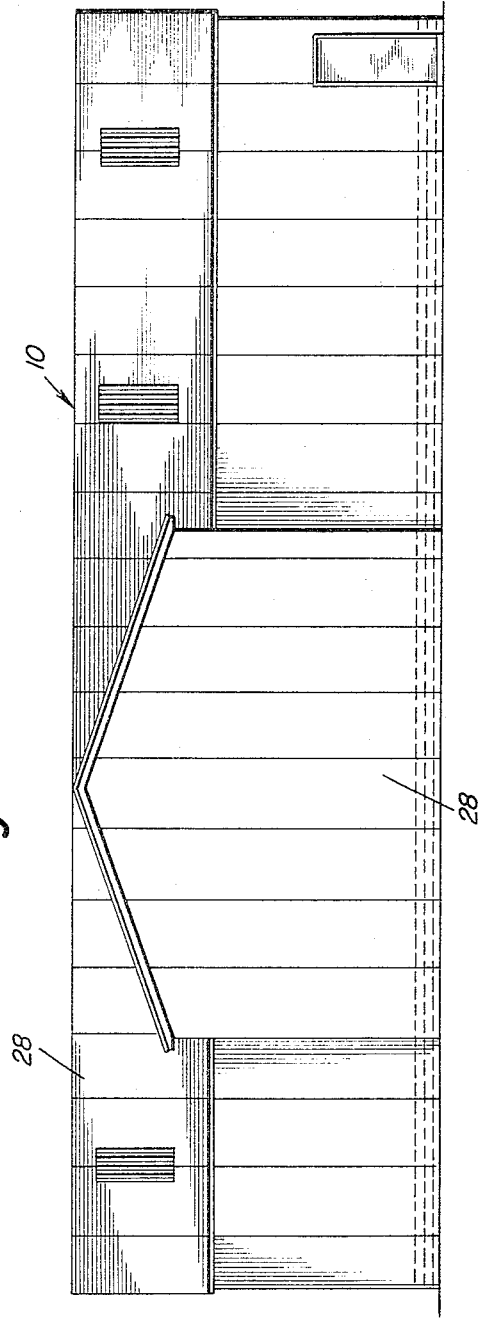
INVENTOR
Walter J. Sackett, Sr.
BY Walter G. Finch
ATTORNEY

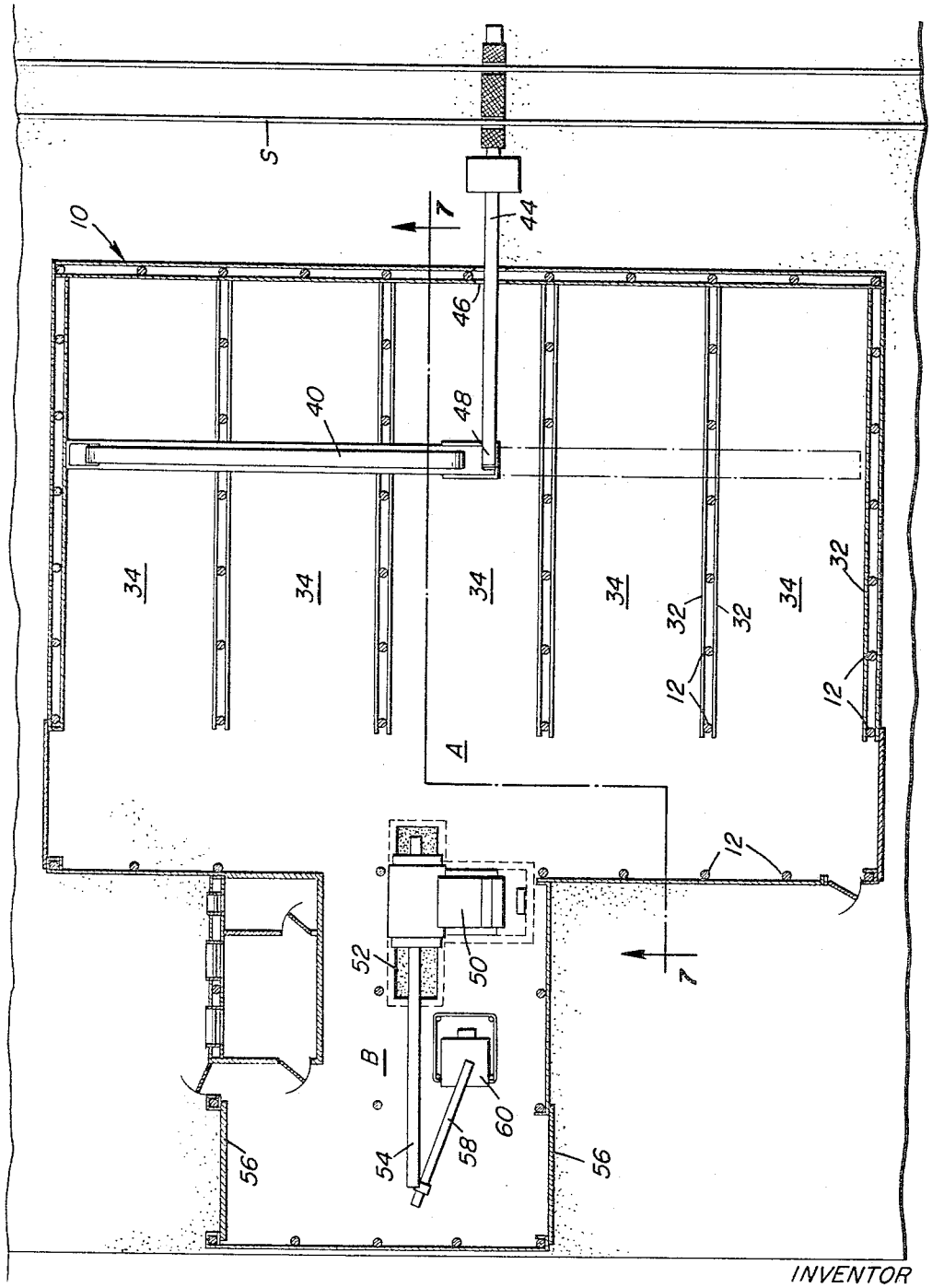

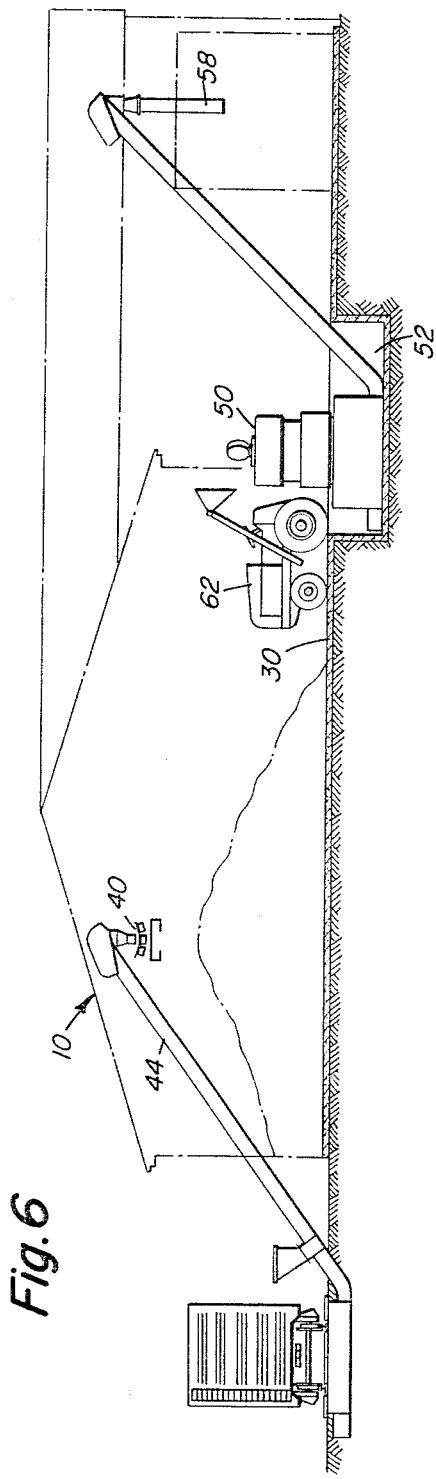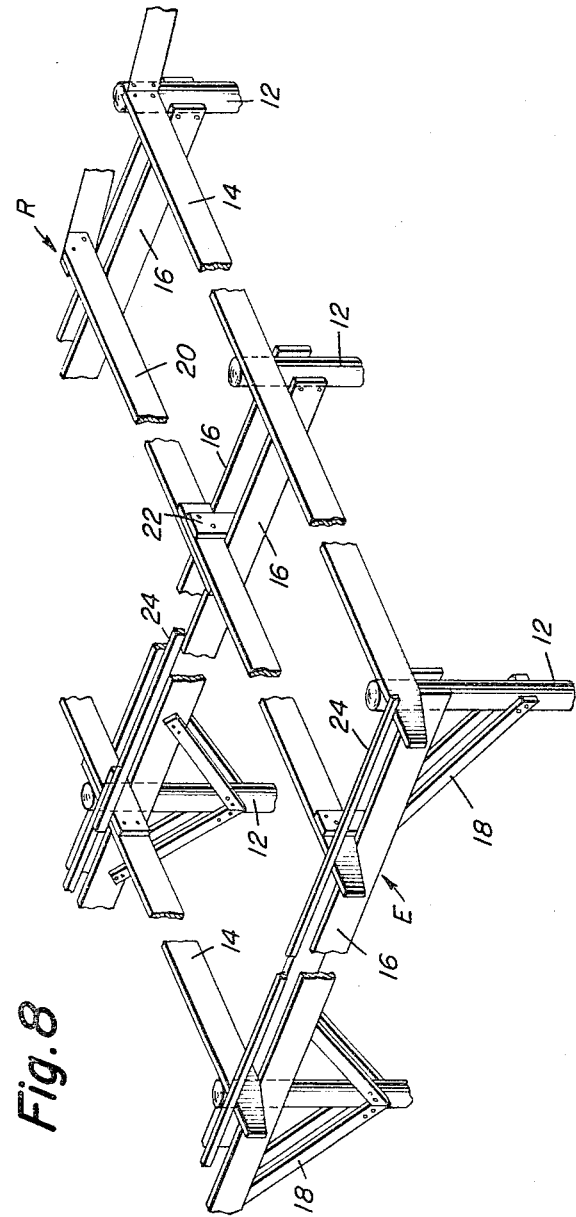

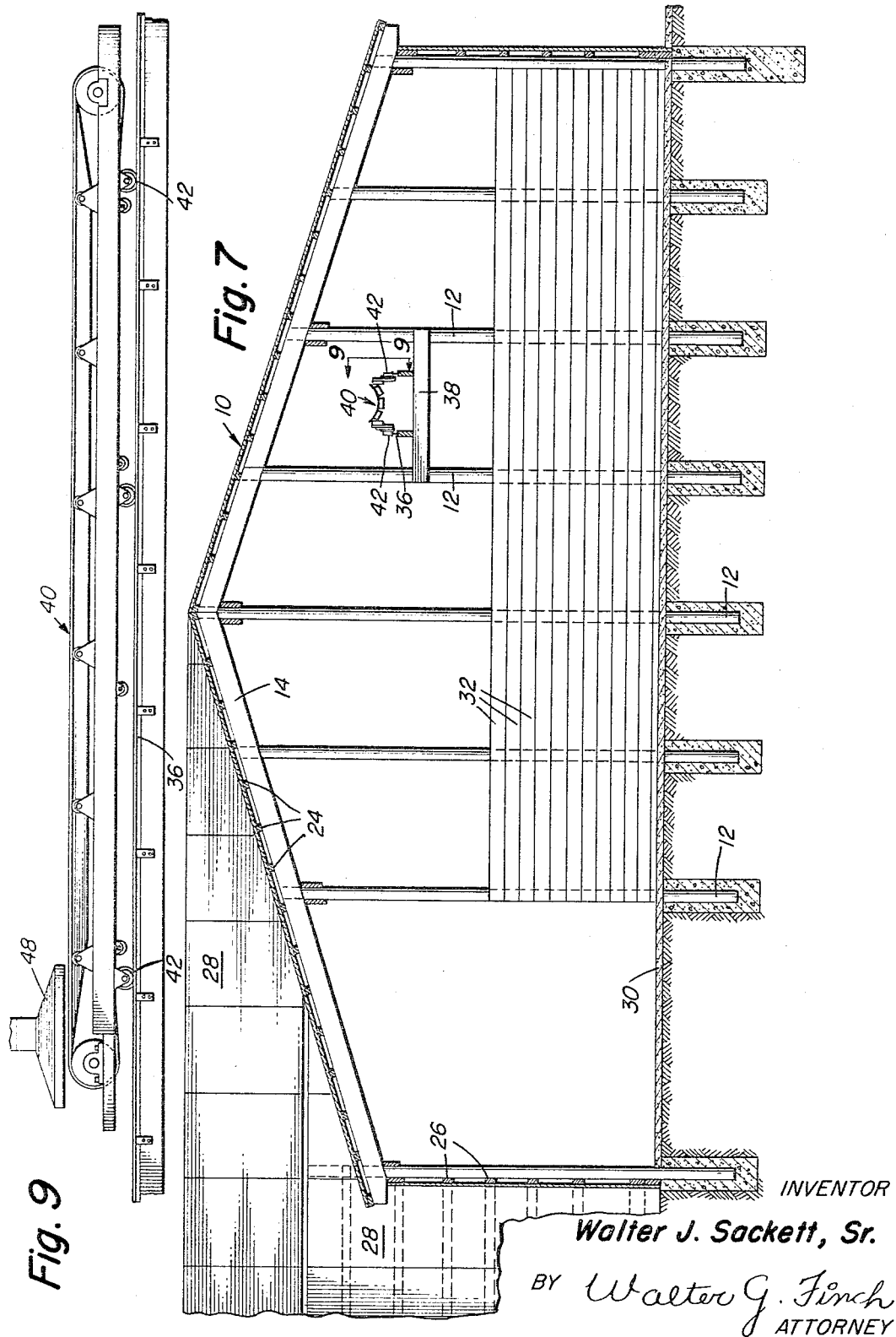

April 11, 1967  W. J. SACKETT, SR  3,313,529
BULK BLEND PLANT AND SYSTEM
Filed Sept. 25, 1964  6 Sheets-Sheet 6

WALTER J. SACKETT, SR.
INVENTOR

BY *Walter G. Finch*
ATTORNEY

# United States Patent Office 3,313,529
Patented Apr. 11, 1967

3,313,529
BULK BLEND PLANT AND SYSTEM
Walter J. Sackett, Sr., 3700 Echodale Ave.,
Baltimore, Md. 21206
Filed Sept. 25, 1964, Ser. No. 399,227
5 Claims. (Cl. 259—154)

This invention relates generally to bulk material handling apparatus, and more particularly it pertains to a plant system for unloading bulk materials, selecting, weighing and mixing them and discharging the product for ultimate use.

It is an object of this invention to provide a compact blending plant for bulk materials which is more economical to construct and operate than any heretofore.

A further object of the invention is to provide an improved bin filling conveyor system which can be built into a compact storage building and which will unload a railroad car or truck selectively to any of a plurality of bins.

Another object of this invention is to provide a building and plant layout which can be operated with substantially continuous flow from bulk material receiving to mixed product delivery with a minimum of handling operations.

Other objects and attendant advantages of this invention will become more readily apparent and understood from the following detailed specification and accompanying drawings in which:

FIGS. 1, 2, 3, and 4 are respectively right side, rear, left side, and front elevations of a bulk blend plant embodying features of this invention;

FIG. 5 is a plan view of the bulk blend plant showing in particular the arrangement of the bin area and discharge area together with the associated handling and blending machinery;

FIG. 6 is a somewhat schematic side view of the arrangement in FIG. 5;

FIG. 7 is a section taken on line 7—7 of FIG. 5;

FIG. 8 is a fragmentary depiction of the building frame construction for the blending plant of the invention;

FIG. 9 is a side elevation of the overhead bin-traversing conveyor taken on line 9—9 of FIG. 7.

Figure 10:
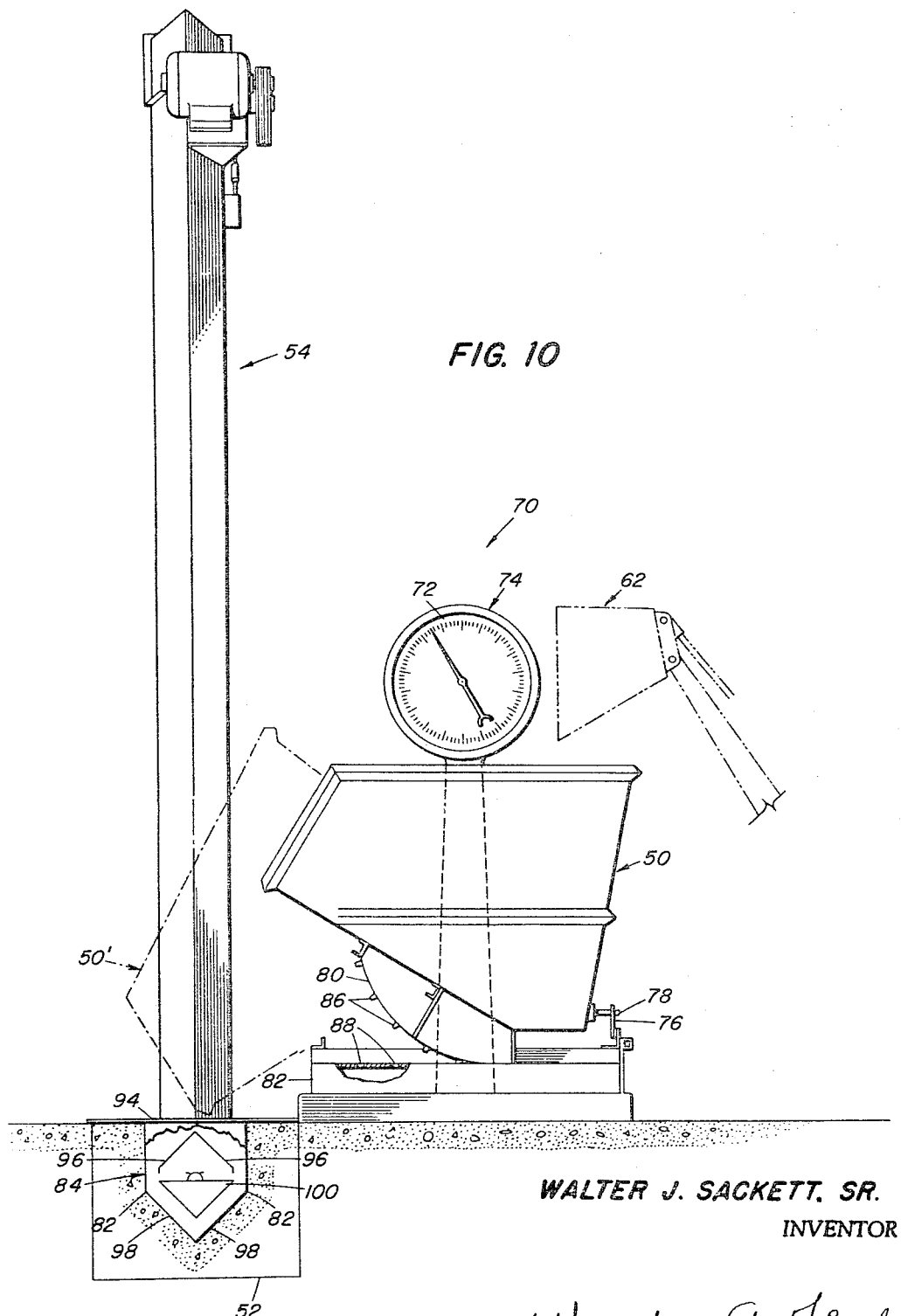
FIG. 10 is an end elevation of the apparatus for weighing, mixing, and delivering of materials.

Referring now to the details of the drawings and particularly FIGS. 1 to 5, it will be noted that the building structure 10 is in a generally T-shaped form in plan view comprising a bin area A as the cross of the T and a mixing-dispensing area B as the vertical leg thereof.

The framework of the building 10 is made up of a plurality of spaced vertical poles 12 set in multiple rectangular array in concrete filled postholes in the ground. The length of the poles 12 are chosen or are cut off after setting to give a rise to a desired ridge R.

As best shown in FIG. 8, the upper ends of the poles 12 are secured to each other by rafters 14 in one direction and by joists 16 in the other direction.

These joists 16 are used in pairs which straddle the poles 12 as shown. At each pole 12, the joists 16 are further secured by diagonal braces 18.

Intermediate rafters 20 are installed and secured to short vertical stubs or scabs 22 extending from between each pair of joists 16. Spaced purlins 24 are then secured across the rafters 14 and 20 from eave E to ridge R.

Horizontal strips or girts 26 are attached at spaced intervals to the outer sides of the peripheral poles 12 of the structure 10 except at door and window locations as shown in FIG. 7. The entire structure is then plated with metal sheeting 28 and a concrete floor 30 laid.

It will be noted the interior of building 10 is unobstructed except for the spaced poles 12 from floor to rafters 14.

Rows of these interior poles 12 are then sheathed from floor to an intermediate height with creosote treated planks 32 thus dividing the area A into a plurality of elongated bins 34 all opening at one end in the general direction of the area B.

Transversely above the bins 34, a two-rail track 36 is installed on supports 38, which extend between adjacent poles 12. A continuous belt, motor driven, reversible conveyer 40 equipped with flanged wheels 42 rides this track 36 as shown best in FIG. 7 and the dot-dash lines in FIG. 5. It should be noted that one end or the other of the conveyor 40 thus can be used as a discharge end and any of the bins 34 can thereby be served.

An elevating type endless flighted conveyer 44 is installed with its lower end or boot under the tracks of a railway spur S alongside the rear of building 10 and extends therein angularly upward through an aperture 46. The upper discharge end 48 of the conveyer 44 is hooded and terminates directly above the line of travel of the traversing conveyer 40 as best shown in FIGS. 6 and 9.

My copending U.S. patent application Ser. No. 309,532, filed Sept. 17, 1963, now Patent No. 3,233,873, for "Apparatus for Weighing, Mixing and Delivering Bulk Fertilizer Material," described an elevating conveyer for discharging a pit type boot.

The above-referenced patent application also discloses a self-dumping, blending and weighing hopper auxiliary to the elevating conveyer. The hopper 50 of this apparatus 70 is installed adjacent a pit 52 in the floor 30 located just inside area B and adjacent to area A of the building 10. Its elevating conveyer 54 is arranged to discharge the hopper 50 from the pit 52 to a truck (not shown) brought in to area B through overhead type doors 56.

The apparatus 70 forms a very important part of the plant system of present invention since the blending of the bulk material is performed thereby.

The bulk ingredients are selected from the bins 34 as required for the blend desired. Selection is made by the operator of a power shovel or lift scoop vehicle 62 which has only a short travel from the bins to the weighing hopper due to the unique shape of the structure 10 and layout as shown in the plan view FIG. 5.

With special reference to FIG. 10, accurate proportions of the ingredients, by weight, are easily maintained by observing a dial 72 of the scale 74 as each ingredient is deposited in the hopper 50.

Upon completion of each batch of fertilizer, a latch lever 76 is manually actuated so as to disengage a pin 78 secured to rear wall of the hopper 50. The weight of the contents of the hopper 50 will then cause the hopper to roll upon its rockers 80, along tracks 82 to the position shown by dash lines at 50' in FIG. 10 thereby dumping its contents into the receiving box 84 of the conveyor 54. The center of gravity of the hopper 50 is so located that, when empty, it will restore itself to the position shown in full lines ready to receive the next batch of ingredients. The rockers 80 are provided, along their periphery, with a series of cogs 86 which engage a series of holes 88 in tracks 82—in the fashion of a gear and rack arrangement—thereby maintaining the proper alignment of the hopper 50 along the tracks 82.

The conveyor 54 comprises a comparatively short horizontal section 90, which passes through the receiving box 84, and an elevating section 92 supported by legs not shown. The adjoining sections 90 and 92 each consist of a closed conduit of generally hexagonal cross-section. A grating 94 is provided, at the top of the receiving box 84, to break up any lumps in the incoming material. The material then slides down over apexed upper panels 96, along the side walls within receiving box 84 and enters a trough formed by lower panels 98. The material thus entering the trough is carried away by a series of triangular blades 100 which are affixed to the endless chain of conveyor 54. The sliding down of the material over the diverging upper panels 96 and over the converging lower panels 98 forming the horizontal section 92 represent a splitting and a recombining of the material during discharge from the hopper 50 and constitutes an effective mixing action of the various materials from hopper 50.

By swinging an orientable discharge sleeve or chute 58 the mixed and elevated output of conveyor 54 may be redirected from the truck to a bagging scale 60.

Obviously many modifications and variations of the present invention are possible in light of the above teachings. It is, therefore, to be understood that within the scope of the appended claims the invention may be practiced otherwise than as specifically described.

What is claimed is:

1. A materials handling system, comprising, means positioned below a structure for receiving material dumped from said structure, means for conveying said dumped material to a selected one of a plurality of spaced storing bins, a pivotally mounted weighing self-dumping hopper spaced from said plurality of bins, means for transferring a selected one of said stored materials to said pivotally mounted self dumping weighing hopper, means for weighing said materials in said hopper, means positioned laterally and below said pivotally mounted weighing hopper for gravity mixing the materials dispensed thereto, and means for conveying the gravity mixed materials to a further spaced point for further disposition.

2. A materials handling system as recited in claim 1, wherein the gravity mixing means splits and recombines the materials dumped from said self-dumping hopper.

3. A materials handling system as recited in claim 1, wherein said self-dumping hopper is provided with means to shift its discharge end forward during the self-dumping motion.

4. A materials handling system as recited in claim 2 wherein said gravity mixing means includes a grating for breaking up any lumps in said dumped materials, a diverging surface structure for splitting the flow of dumped materials passing through said grating, a converging surface structure for receiving and recombining the split flow of said dumped materials, with said conveying means operating across said converging surface structure for removing the combined flow of dumped materials thereon.

5. A materials handling system as recited in claim 4 wherein said spaced storing bins open towards said self-dumping hopper, and said transferring means include a front-end loader.

References Cited by the Examiner

UNITED STATES PATENTS

| | | | |
|---|---|---|---|
| 486,367 | 11/1892 | Bierce | 52—234 |
| 619,463 | 2/1899 | Bartlett | 214—16 |
| 683,441 | 10/1901 | Cooley | 52—234 |
| 1,313,375 | 8/1919 | Frazier. | |
| 1,720,822 | 7/1929 | Craine | 214—16 |
| 2,271,434 | 1/1942 | Johnson | 214—2 |
| 2,519,153 | 8/1950 | Roura. | |
| 2,579,708 | 12/1951 | Smith | 214—2 |
| 3,197,044 | 7/1965 | Hozak | 214—16 |

MARVIN A. CHAMPION, *Primary Examiner.*